(12) United States Patent
McCaskey et al.

(10) Patent No.: US 7,500,603 B2
(45) Date of Patent: Mar. 10, 2009

(54) DATA CARD

(75) Inventors: Daniel W. McCaskey, Chapel Hill, NC (US); Carolyn DeNoia McCarty, Richmond, VA (US); Marc William Mentry, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 205 days.

(21) Appl. No.: 11/064,147

(22) Filed: Feb. 22, 2005

(65) Prior Publication Data

US 2005/0194436 A1      Sep. 8, 2005

Related U.S. Application Data

(60) Provisional application No. 60/546,373, filed on Feb. 19, 2004.

(51) Int. Cl.
*G06K 5/00* (2006.01)

(52) U.S. Cl. .......................... 235/380; 235/493

(58) Field of Classification Search .......... 235/380, 235/493; 705/17
See application file for complete search history.

(56) References Cited

U.S. PATENT DOCUMENTS

| | | | |
|---|---|---|---|
| 2,616,612 A | 11/1952 | Guttman |
| 2,896,351 A | 7/1959 | Johnson |
| 3,505,954 A | 4/1970 | Projansky |
| 3,583,317 A | 6/1971 | Gibson |
| 3,592,722 A | 7/1971 | Morgan |
| 3,637,994 A | 1/1972 | Ellingboe |
| 3,876,864 A | 4/1975 | Clark et al. |
| 3,921,318 A | 11/1975 | Calavetta |
| 4,092,526 A | 5/1978 | Beck |
| 4,278,880 A | 7/1981 | Buros |
| D264,853 S | 6/1982 | Scavino et al. |
| 4,360,728 A | 11/1982 | Drexler |
| D270,546 S | 9/1983 | Malmberg |
| 4,443,027 A | 4/1984 | McNeely et al. |
| 4,454,414 A * | 6/1984 | Benton ......................... 705/41 |
| 4,507,550 A | 3/1985 | Fleer |
| D280,214 S | 8/1985 | Opel |

(Continued)

FOREIGN PATENT DOCUMENTS

CA      2303827 A1      9/2001

(Continued)

OTHER PUBLICATIONS

Discover 2Go Card; http://www.discover2go.com; 5 pages; Jan. 15, 2003.

(Continued)

*Primary Examiner*—Daniel St.Cyr
(74) *Attorney, Agent, or Firm*—Baker & McKenzie LLP

(57) ABSTRACT

A data card for facilitating a transaction, including a card body having a front surface and a back surface, a first data storage section storing a first set of data, a second data storage section storing a second set of data, a third data storage section storing a third set of data, and a fourth data storage section storing a fourth set of data. At least two of the first data storage section, the second data storage section, the third data storage section, and the fourth data storage section store different data. Each of the data storage sections is operable for facilitating the same transaction.

54 Claims, 8 Drawing Sheets

U.S. PATENT DOCUMENTS

| | | | |
|---|---|---|---|
| 4,562,342 A | 12/1985 | Solo | |
| 4,609,812 A | 9/1986 | Drexler | |
| 4,620,727 A | 11/1986 | Stockburger et al. | |
| 4,634,848 A | 1/1987 | Shinohara et al. | |
| 4,645,916 A | 2/1987 | Raisleger | |
| 4,656,346 A | 4/1987 | Drexler | |
| 4,659,914 A | 4/1987 | Kondo et al. | |
| D290,136 S | 6/1987 | Ball et al. | |
| 4,683,371 A | 7/1987 | Drexler | |
| 4,752,676 A | 6/1988 | Leonard et al. | |
| 4,806,740 A | 2/1989 | Gold et al. | |
| 4,855,583 A | 8/1989 | Fraser et al. | |
| D305,887 S | 2/1990 | Nishimura | |
| D310,386 S | 9/1990 | Michels et al. | |
| 5,128,524 A | 7/1992 | Anglin et al. | |
| 5,171,039 A | 12/1992 | Dusek | |
| 5,208,742 A * | 5/1993 | Warn | 700/2 |
| 5,308,121 A | 5/1994 | Gunn | |
| 5,326,964 A | 7/1994 | Risser | |
| D358,419 S | 5/1995 | Runyan | |
| D359,305 S | 6/1995 | Finkelstein | |
| 5,424,523 A | 6/1995 | Ohno et al. | |
| 5,440,108 A | 8/1995 | Tran et al. | |
| D367,273 S | 2/1996 | Ebe | |
| 5,550,709 A | 8/1996 | Iwasaki | |
| 5,559,885 A | 9/1996 | Drexler et al. | |
| D374,870 S | 10/1996 | Gaumet | |
| D375,303 S | 11/1996 | Gaumet | |
| D379,006 S | 4/1997 | Gaumet | |
| D387,802 S | 12/1997 | Finkelstein et al. | |
| 5,700,037 A | 12/1997 | Keller | |
| 5,760,381 A | 6/1998 | Stich et al. | |
| 5,818,030 A | 10/1998 | Reyes | |
| 5,844,230 A | 12/1998 | Lalonde | |
| D406,861 S | 3/1999 | Leedy, Jr. | |
| 5,883,377 A | 3/1999 | Chapin, Jr. | |
| 5,918,909 A | 7/1999 | Fiala et al. | |
| 5,975,302 A | 11/1999 | Young | |
| 5,984,191 A | 11/1999 | Chapin, Jr. | |
| D427,167 S | 6/2000 | Iwasaki | |
| 6,107,221 A | 8/2000 | Nakajima et al. | |
| 6,138,917 A | 10/2000 | Chapin, Jr. | |
| D434,041 S | 11/2000 | Burke | |
| D436,620 S | 1/2001 | Webb et al. | |
| D436,991 S | 1/2001 | Morgante | |
| D437,882 S | 2/2001 | Creighton | |
| D438,562 S | 3/2001 | Webb et al. | |
| D438,563 S | 3/2001 | Webb et al. | |
| 6,222,914 B1 | 4/2001 | McMullin | |
| D442,222 S | 5/2001 | Webb et al. | |
| D442,627 S | 5/2001 | Webb et al. | |
| D442,628 S | 5/2001 | Webb et al. | |
| D442,629 S | 5/2001 | Webb et al. | |
| D443,298 S | 6/2001 | Webb et al. | |
| D447,515 S | 9/2001 | Faenza, Jr. et al. | |
| 6,290,137 B1 | 9/2001 | Kiekhaefer | |
| D449,336 S | 10/2001 | Webb et al. | |
| 6,296,188 B1 | 10/2001 | Kiekhaefer | |
| 6,315,206 B1 | 11/2001 | Hansen et al. | |
| D453,160 S | 1/2002 | Pentz et al. | |
| D453,161 S | 1/2002 | Pentz | |
| D453,336 S | 2/2002 | Pentz et al. | |
| D453,337 S | 2/2002 | Pentz et al. | |
| D453,338 S | 2/2002 | Pentz et al. | |
| D453,339 S | 2/2002 | Pentz | |
| D453,516 S | 2/2002 | Pentz | |
| D453,517 S | 2/2002 | Pentz | |
| D454,910 S | 3/2002 | Smith et al. | |
| D456,814 S | 5/2002 | Pentz | |
| D457,556 S | 5/2002 | Hochschild | |
| 6,386,591 B1 | 5/2002 | Blank | |
| 6,402,029 B1 | 6/2002 | Gangi | |
| 6,402,039 B1 | 6/2002 | Freeman et al. | |
| D460,455 S | 7/2002 | Pentz | |
| D461,477 S | 8/2002 | Pentz | |
| 6,439,613 B2 | 8/2002 | Klure | |
| D462,965 S | 9/2002 | Pentz | |
| D462,966 S | 9/2002 | Pentz et al. | |
| D464,355 S | 10/2002 | Burke | |
| 6,471,127 B2 | 10/2002 | Pentz et al. | |
| 6,484,940 B1 | 11/2002 | Dilday et al. | |
| D467,247 S | 12/2002 | Pentz | |
| D468,313 S | 1/2003 | Burke | |
| D469,777 S | 2/2003 | Burke | |
| 6,543,809 B1 | 4/2003 | Kistner et al. | |
| 6,561,432 B1 | 5/2003 | Vedder et al. | |
| 6,588,658 B1 | 7/2003 | Blank | |
| 6,594,640 B1 | 7/2003 | Postrel | |
| 6,601,769 B2 | 8/2003 | Barnhill et al. | |
| 6,631,849 B2 | 10/2003 | Blossom | |
| 6,693,544 B1 | 2/2004 | Hebbecker | |
| 6,698,116 B2 | 3/2004 | Waldron | |
| D490,104 S | 5/2004 | Lubking | |
| D498,788 S | 11/2004 | Lubking | |
| 6,834,809 B2 | 12/2004 | Ogushi | |
| 2001/0034720 A1 | 10/2001 | Armes | |
| 2001/0054003 A1 | 12/2001 | Chien et al. | |
| 2002/139849 A1 | 10/2002 | Gangi | |
| 2002/0152116 A1 | 10/2002 | Yan et al. | |
| 2002/0198779 A1 | 12/2002 | Rowen et al. | |
| 2003/0024995 A1 | 2/2003 | Conner et al. | |
| 2003/0069846 A1 | 4/2003 | Marcon | |
| 2003/0075609 A1 | 4/2003 | Kim | |
| 2003/0083933 A1 | 5/2003 | McAlear | |
| 2003/0111527 A1 | 6/2003 | Blossom | |
| 2003/0209608 A1 | 11/2003 | Blossom | |
| 2004/0010462 A1 * | 1/2004 | Moon et al. | 705/39 |
| 2004/0011877 A1 | 1/2004 | Reppermund | |
| 2004/0026915 A1 | 2/2004 | Thompson et al. | |
| 2004/0210448 A1 | 10/2004 | Breck | |
| 2004/0210449 A1 | 10/2004 | Breck | |
| 2005/0017081 A1 | 1/2005 | Kondo et al. | |

FOREIGN PATENT DOCUMENTS

| | | |
|---|---|---|
| DE | 2829778 | 1/1980 |
| DE | 3005432 | 2/1980 |
| EP | 0024800 | 3/1981 |
| FR | 2330094 | 5/1977 |
| GB | 1354978 A | 6/1974 |
| GB | 2105080 A | 3/1983 |
| JP | 58161077 A | 9/1983 |
| JP | 59148931 A | 8/1984 |
| JP | 59148932 A | 8/1984 |
| JP | 63304425 | 12/1988 |
| JP | 2121117 | 5/1990 |
| JP | 5205115 | 8/1993 |
| JP | 2001101363 | 4/2001 |
| JP | 2002024782 | 1/2002 |

OTHER PUBLICATIONS

Legon, Jeordan; "Companies aim to make paying faster, easier"; http://www.cnn.com/2002/TECH/ptech/11/26/mini.credit; Jan. 15, 2003.

USA: Bank of America is launching a mini bank card; http://www.qualisteam.c.om/news; Jan. 15, 2003.

Mini Card; http://bankofamerica.com/creditcards/index.cfm?template=cc_features_minicard?adlin; Jan. 15, 2003.

Mini Credit Card on a Keychain; Credit Card Innovation Lets Customers Make Purchases Faster and Easier;http://www.newstream.com/us/story_pub.shtml?story_id=7934&user_ip=206.

Multimedia Available: Mini Credit Card on KeyChain; http://money.cnn.com/services/tickerheadlines/bw/223380293.htm; Jan. 15, 2003.

Bank of America Platinum Check Card.

"Dual Stripe Magnetic Card", IBM Technical Disclosure Bulletin, pg. 5928, May 1980.

Ellen Leander, "Collegian: captive audience for smart cards?", American Banker, Tuesday, Sep. 12, 1995, Copyright 2003 Gale Group.

\* cited by examiner

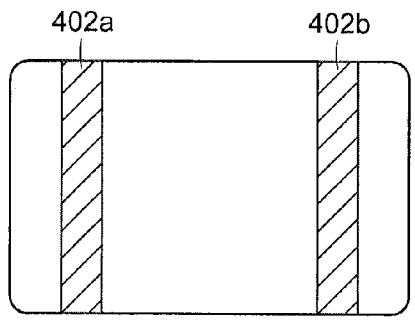
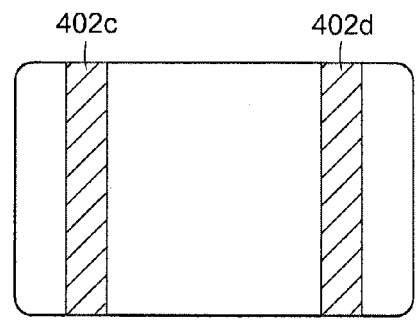
FIG. 4A  FIG. 4B
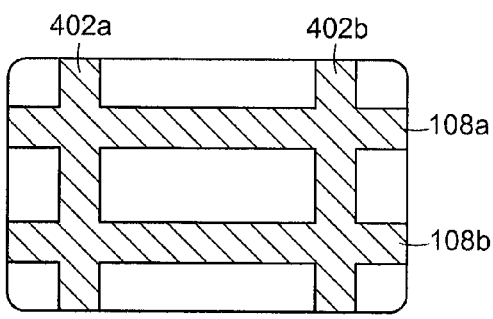
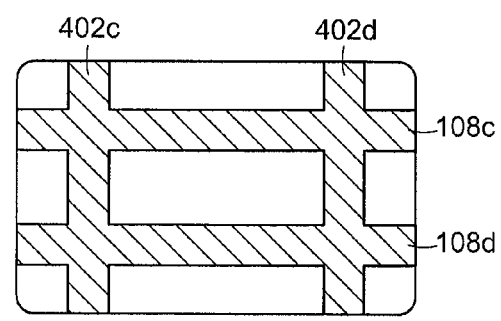
FIG. 4C  FIG. 4D

DATA CARD

CROSS-REFERENCE TO RELATED APPLICATIONS

This application claims the benefit of provisional U.S. Patent Provisional Application No. 60/546,373, entitled DATA CARD, filed Feb. 19, 2004.

FIELD

The present application relates to a data card, and more particularly to a data card having a plurality of data storage sections.

BACKGROUND

Data cards are commonly used to store information for performing transactions. The transactions may, for example, be financial transactions such as purchases performed at a point of sale ("POS") terminal or cash withdrawals carried out using an automated teller machine ("ATM"). Additionally, data cards may be used to perform other actions including transactions related to identity verification, security access, medical procedures, and machine operation.

Traditional data cards have a single magnetic strip located on a back face of the data card for storing data. Use of such data cards involves reading data stored on the data cards by swiping the data card through, or inserting the data card into, a reading device. For example, in performing financial transactions as described above, the data card may be swiped through a card reader at a POS terminal, or the data card may be inserted into an ATM to read the data stored thereon.

Data card reading devices typically include a magnetic reading mechanism for reading data encoded on the magnetic strip of the traditional data card. Reading of traditional data cards, therefore, requires swiping or inserting the data card such that the magnetic data strip is properly oriented with respect to the reading device. As a result, a cardholder or merchant must determine the proper orientation of the data card before inserting the data card into the ATM or swiping the data card at the POS terminal.

This orientation requirement often necessitates multiple attempts at swiping or inserting the data card before the proper orientation is selected. For example, the ATM or POS terminal may not be marked or not clearly marked with swiping or insertion instructions. Persons with impaired vision may encounter particular difficulty in properly orienting and presenting the data card to the reading device. Furthermore, such reading devices are placed in outdoor locations, which may present additional visibility and security concerns.

Additionally, in some instances a card reading device may be configured to capture and retain a data card that has been improperly presented for reading, requiring a user to perform an inconvenient retrieval process to regain possession of the data card.

Therefore, a need exists for a data card that includes a plurality of data storage sections such as magnetic data strips. For example, two magnetic data strips may be located on the two horizontal edges of the front surface and two magnetic data strips may be located on the two horizontal edges of the back surface of a data card, such that the data card may be swiped or inserted in any orientation by a user without concern for the orientation of the data card.

SUMMARY

An aspect of the present application provides for a method for facilitating a transaction, comprising providing a data card including a plurality of data storage sections, the plurality of data storage sections including at least a first data storage section, a second data storage section, a third data storage section, and a fourth data storage section, storing a first set of data on at least the first data storage section, storing a second set of data on at least the second data storage section, storing a third set of data on at least the third data storage section, storing a fourth set of data on at least the fourth data storage section, receiving one of the first set of data, the second set of data, the third set of data, and the fourth set of data associated with the transaction from a reading device, and evaluating the received set of data associated with the transaction, wherein at least two of the first set of data, the second set of data, the third set of data, and the fourth set of data have different data, and the transaction is the same regardless of whether the first set of data, the second set of data, the third set of data, and the fourth set of data is received and evaluated.

A further aspect of the present application provides for a method for facilitating an action, comprising providing a data card including a plurality of data storage sections, the plurality of data storage sections including at least a first data storage section, a second data storage section, a third data storage section, and a fourth data storage section, storing a first set of data on at least the first data storage section, storing a second set of data on at least the second data storage section, storing a third set of data on at least the third data storage section, storing a fourth set of data on at least the fourth data storage section, receiving one of the first set of data, the second set of data, the third set of data, and the fourth set of data associated with the action from a reading device, and evaluating the received set of data associated with the action, wherein at least two of the first set of data, the second set of data, the third set of data, and the fourth set of data have different data, and the action is the same regardless of whether the first set of data, the second set of data, the third set of data, and the fourth set of data is received and evaluated.

A still further aspect of the present application provides for a method for providing a data card that facilitates a transaction, comprising locating a plurality of data storage sections on the data card, the plurality of data storage sections including at least a first data storage section, a second data storage section, a third data storage section, and a fourth data storage section, storing a first set of data on at least the first data storage section, storing a second set of data on at least the second data storage section, storing a third set of data on at least the third data storage section, storing a fourth set of data on at least the fourth data storage section, wherein at least two of the first set of data, the second set of data, the third set of data, and the fourth set of data have different data.

A still further aspect of the present application provides for a method for performing a transaction, comprising presenting a data card having a first storage section, a second storage section, a third storage section, and a fourth storage section without concern for an orientation of the data card, wherein a first set of data is stored on the first data storage section, a second set of data is stored on the second data storage section, a third set of data is stored on the third data storage section, a fourth set of data is stored on the fourth data storage section, at least two of the first set of data, the second set of data, the third set of data, and the fourth set of data have different data, and the first set of data, the second set of data, the third set of data, and the fourth set of data are operable for performing the same transaction.

A still further aspect of the present application provides for a data card for facilitating a transaction, comprising a card body having a front surface and a back surface, a first data storage section storing a first set of data, the first data storage section located on the front surface, a second data storage section storing a second set of data, the second data storage section located on the front surface, a third data storage section storing a third set of data, the third data storage section located on the back surface, and a fourth data storage section storing a fourth set of data, the fourth data storage section located on the back surface, wherein at least two of the first data storage section, the second data storage section, the third data storage section, and the fourth data storage section store different data, and each of the data storage sections is operable for facilitating the same transaction.

BRIEF DESCRIPTION OF THE DRAWINGS

FIG. 4A illustrates an exemplary front surface of a data card according to the exemplary embodiments of the present application;

FIG. 4B illustrates an exemplary back surface of the data card shown in FIG. 4A;

FIG. 4C illustrates an exemplary front surface of a data card according to the exemplary embodiments of the present application;

FIG. 4D illustrates an exemplary back surface of the data card shown in FIG. 4C;

DETAILED DESCRIPTION

The exemplary embodiments of the present application relate to a data card for storing information used in performing an action, for instance, a transaction. The data card may include a plurality of data storage sections. Different information may be stored on one or more of the plurality of data storage sections. However, each data storing section is operable for performing the same action. For example, data stored on each data storage section may relate to a common account in order to engage in a transaction. The data card may therefore be presented for reading by a user without concern for a specific orientation of the data card with respect to a card reading device.

Figure 1A:
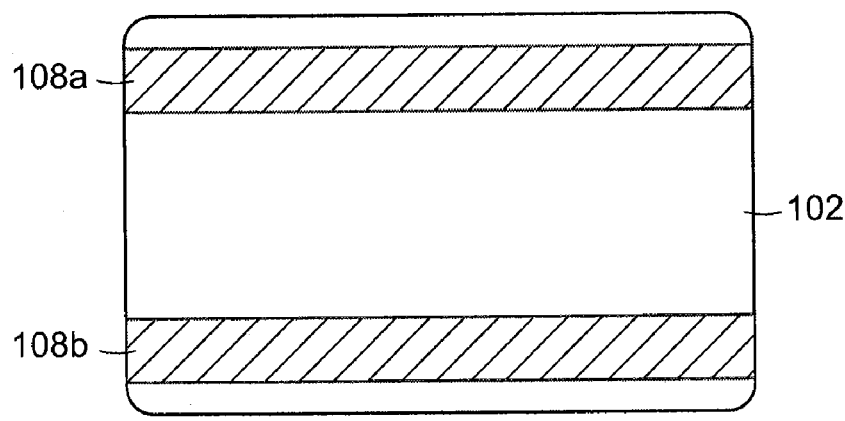
FIG. 1A shows an exemplary front surface of a data card according to the exemplary embodiments of the present application.
Figure 1B:
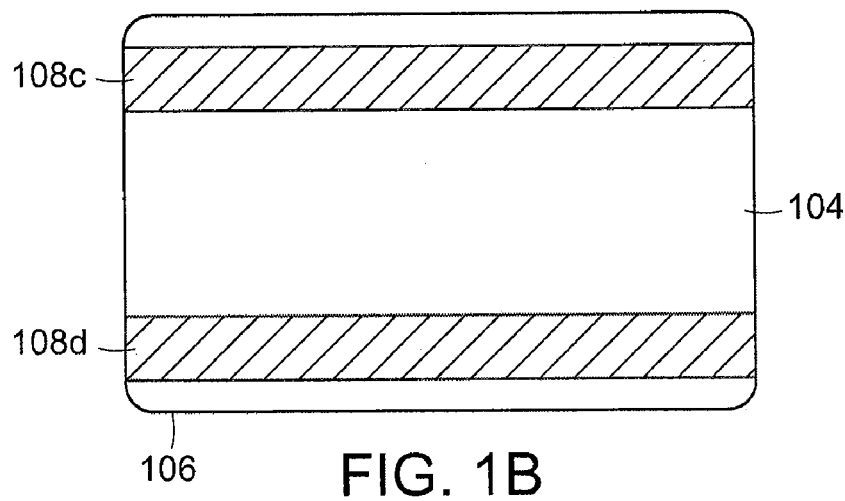
FIG. 1B shows an exemplary back surface of the data card shown in FIG. 1A.

An exemplary data card 100 is illustrated in FIGS. 1A and 1B. In an exemplary embodiment, the data card 100 is substantially rectangular and formed such that a horizontal dimension is larger than a vertical dimension, as shown in FIGS. 1A and 1B. Various terms including "front," "back," "horizontal," "vertical," and "edge," are used in the present application to refer to the exemplary data cards. As will be appreciated by one skilled in the art, however, exemplary data cards of the present application are not limited to the structure and its dimensions described and illustrated in the present application.

Exemplary data card 100 as shown in FIGS. 1A-1B includes a card body 106 having a front surface 102 and a back surface 104. The card body 106 may be formed of any suitable opaque and transparent material. The card body 106 may be formed of uniform material throughout, or may be constructed of a plurality of materials. Also, the card body 106 may have smooth or textured front and back surfaces.

The exemplary data card 100 may include a plurality of data storage sections 108a, 108b, 108c, and 108d. In an exemplary embodiment, the data card includes four data storage sections, each data storage section being a substantially rectangular magnetic strip. Two data storage sections 108a, 108b are located on the front surface 102 and two data storage sections 108c, 108d are located on the back surface 104 of card body 106, as illustrated in FIGS. 1A-1B. More particularly, data storage section 108a is located along an upper horizontal edge of the front surface 102, and data storage section 108b is located along a lower horizontal edge of the front surface 102. Additionally, data storage section 108c is located along an upper horizontal edge of the back surface 104, and data storage section 108d is located along a lower horizontal edge of the back surface 104.

Each of the data storage sections 108a-108d are operable for storing data, the data on each of the data storage sections 108a-108d being identical or different. Alternatively, at least a portion of the data on at least one of the data storage sections 108a-108d is different. Data stored on a respective one of the data storage sections 108a-108d may differ from another one of the data storage sections 108a-108d in any manner or magnitude. Each of the data storage sections 108a-108d are operable, however, for performing the same action, such as a transaction, as described in the present application.

In alternate embodiments an exemplary data card 100 may include more or less than four data storage sections, and the data storage sections 108a-108d may be formed in a shape other than a substantially rectangular strip. The data storage sections 108a-108d may be offset by a predetermined distance from the horizontal edges of exemplary data card 100. The data storage sections 108a-108d can be attached to or integrated into card body 106 using any suitable adhesive or lamination process.

In an exemplary embodiment, the data storage sections 108a-108d are formed of a material having magnetic properties, such that data may be stored magnetically on the data storage sections. The use of traditional magnetic data storage strips for storing data on data cards is well-known in the art and is therefore not described in detail herein. As will be appreciated by a person having ordinary skill in the art, a magnetic data strip may include one or more tracks having a plurality of data fields.

Figure 2:
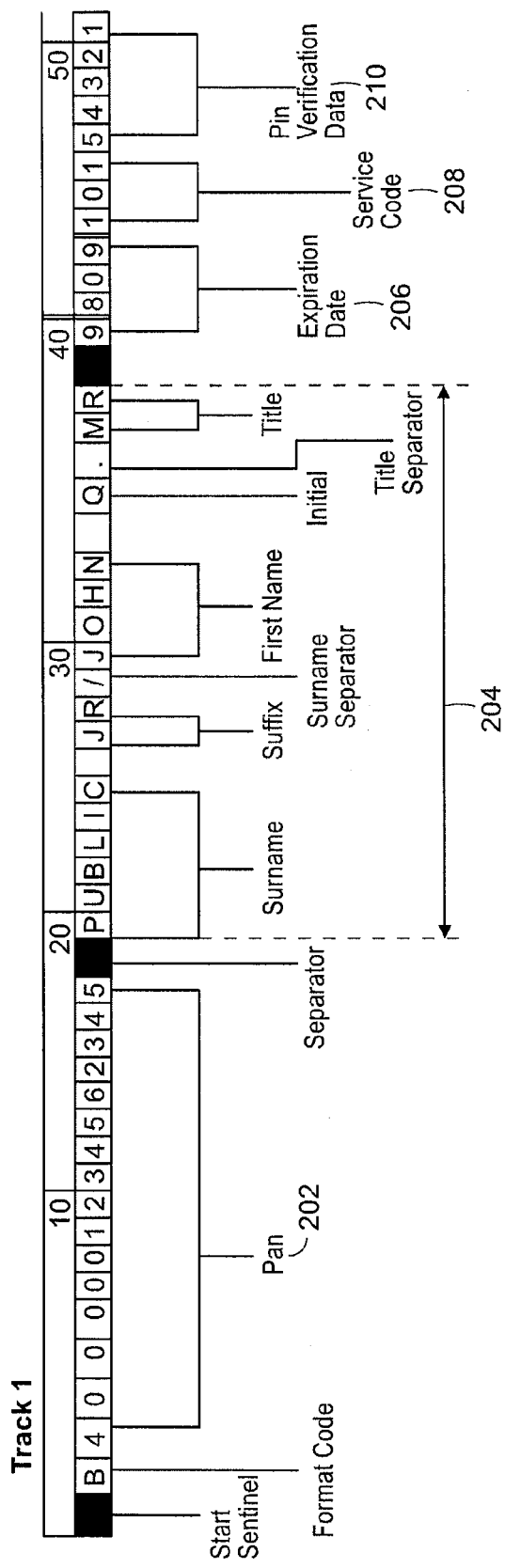
FIG. 2 illustrates exemplary data fields associated with a track of a data storage section according to the exemplary embodiments of the present application.
Figure 2:
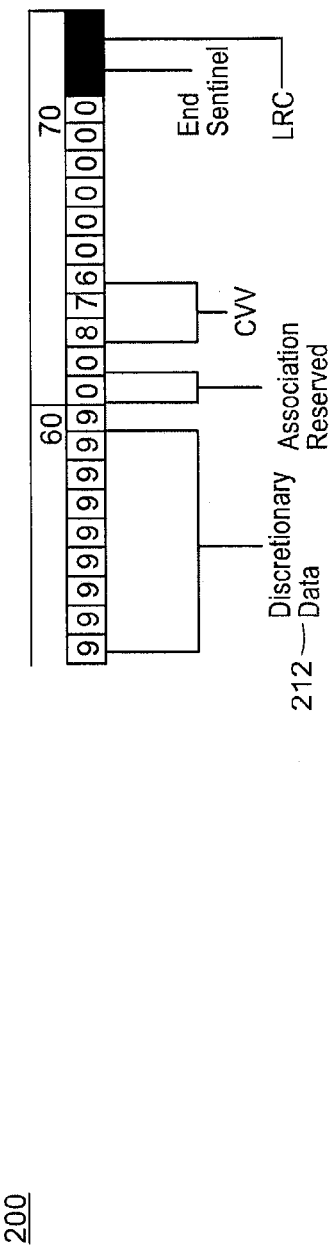
Figure 3:
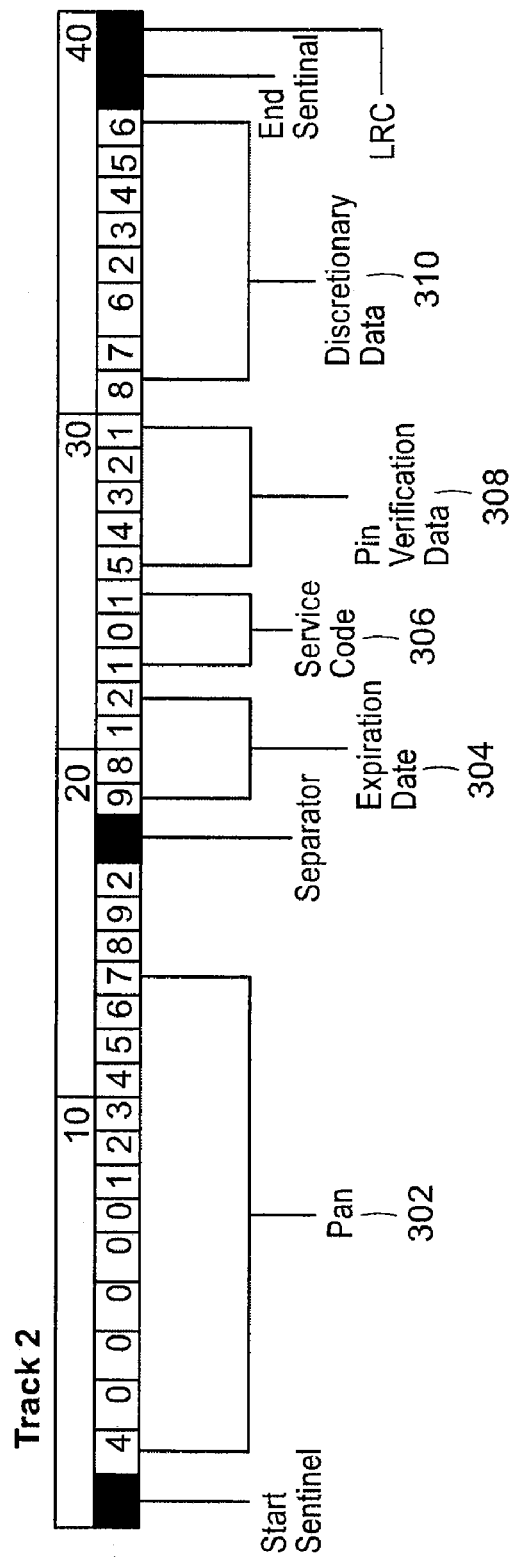
FIG. 3 illustrates exemplary data fields associated with another track of the data storage section shown in FIG. 2.

FIGS. 2-3 illustrate two tracks that may be associated with each data storage section 108a-108d. Specifically, FIG. 2 illustrates exemplary data fields associated with track 1 200 of a data storage section in the form of a magnetic strip. FIG. 3 illustrates exemplary data fields associated with track 2 300 of a data storage section in the form of a magnetic strip. Track 1 200 and track 2 300 as depicted in FIGS. 2-3 include exemplary data stored thereon for the purpose of illustration.

Alternatively, data storage sections 108a-108d may each include a single track or may each include more than two tracks. As will also be appreciated by a person having ordinary skill in the art, a magnetic data strip often includes multiple tracks to accommodate different card reading devices that may read different tracks. The data fields of one of the multiple tracks may also be empty and not have any data stored therein. Exemplary embodiments of the present application are equally applicable to a data storage section in the form of a magnetic strip having only one track.

As described in the present application, data are stored in each of the data storage sections 108a-108d. The present application, however, is not meant to be limited to any particular similarity or difference of the quantity or content of those data between any two or more of the data storage sections 108a-108d. For instance, at least two of the data storage sections 108a-108d can have at least a portion of their data that are different. Alternatively, the data stored in each of the data storage sections 108a-108d can be entirely different. In a further alternative embodiment, the identical data can be stored on each of the data storage sections 108a-108d. The data stored in the data fields of the data storage sections 108a-108d can be purposely selected or randomly determined. As a result, randomly selected data can be stored in each of the data storage sections 108a-108d if the randomly selected data are recorded in memory unit 514 for later retrieval, as described in more detail in the present application.

In an exemplary embodiment, the data fields of track 1 200 may be encoded with data indicating account number 202, user name 204, expiration date 206, service code 208, and personal identification number ("PIN") verification data 210, as shown in FIG. 2. Track 1 200 may also include a discretionary data field 212 which may be used to store any arbitrary data.

The data fields of track 2 300, as shown in FIG. 3, may be encoded with data corresponding to, for example, account number 302, expiration date 304, service code 306, and PIN verification data 308. Track 2 300 may also include a discretionary data field 310 which may be used to store any arbitrary data.

As shown in FIGS. 2 and 3, each track may include start and end sentinel fields, and the plural data fields may be separated by separators placed at arbitrary locations depending upon the nature of the data stored thereon. Other exemplary data fields may be included on the data tracks, as illustrated in FIGS. 2 and 3.

The above-described fields, however, are merely illustrative. The present invention is not limited to the data fields of the exemplary embodiments as shown in FIGS. 2-3. For instance, additional data fields may be included, a size of a respective data field may be different, categories of data stored may be added or removed, and a sequence of data fields in a respective track may be different.

Additionally, as will be understood by a person having ordinary skill in the art, the present invention is not limited to four data storage sections 108a-108d operable as magnetic data strips. More or less than four data storage sections 108a-108d may be located on exemplary data card 100 on front surface 102 or back surface 104.

For example, one or more vertical data storage sections 402a-402d may be located along one or more of the vertical edges of data card 100, as shown in FIGS. 4A-4B. The one or more vertical data storage sections 402a-402d located along the vertical edges may be in substitution for or in addition to magnetic data strips located along the horizontal edges of data card 100 as described and shown in the present application. Therefore an alternate embodiment of the data card may include, for example, eight data storage sections including a data storage section along each horizontal edge of the front surface 102 and along each horizontal edge of the back surface 104 of the exemplary data card 100, in addition to a vertical data storage section located along each vertical edge of the front surface and along each vertical edge of the back surface of the data card, as shown in FIGS. 4C-4D.

Indicia may be located on the front surface 102 and/or the back surface 104 of the data card 100. The indicia may include identification information, for example, an account number, an expiration date, and a name of a cardholder. Other indicia can also be located on the front surface 102 and/or the back surface 104 and can be associated with one or more of data storage sections 108a-108d. Additionally, a signature box may be located on back surface 104. Front surface 102 and back surface 104 may include other information in addition to or in place of indicia and signature box.

Depending on the data stored on the data card 100 and the reading device 502 that reads data card 100, data card 100 may be operable to perform a variety of actions. One exemplary action is facilitating a transaction by accessing an account associated with data card 100. The account may be one or more of several types, including a financial account such as a checking account, a credit account, a savings account, a money market account, a brokerage account, a trust account, a mortgage account, and a home equity line of credit account. The account type may also include one or more of a loyalty reward point account, a medical account, a security access account, an academic account, a residence account, an association membership account, a lodging or transportation account, and the like.

As will be appreciated by one skilled in the art, the term "account" may include any arrangement providing for dealings or services, and may include a collection of transactions involving items, services, persons, etc. The account may be preexisting or may be established upon use of the data card 100.

Alternatively, data card 100 may be operable to perform other actions, including granting access to a secured area or room, facilitating retrieval of stored data such as medical and/or financial data, allowing use of a machine or computer system, or granting access to a transportation or entertainment service.

Figure 5:
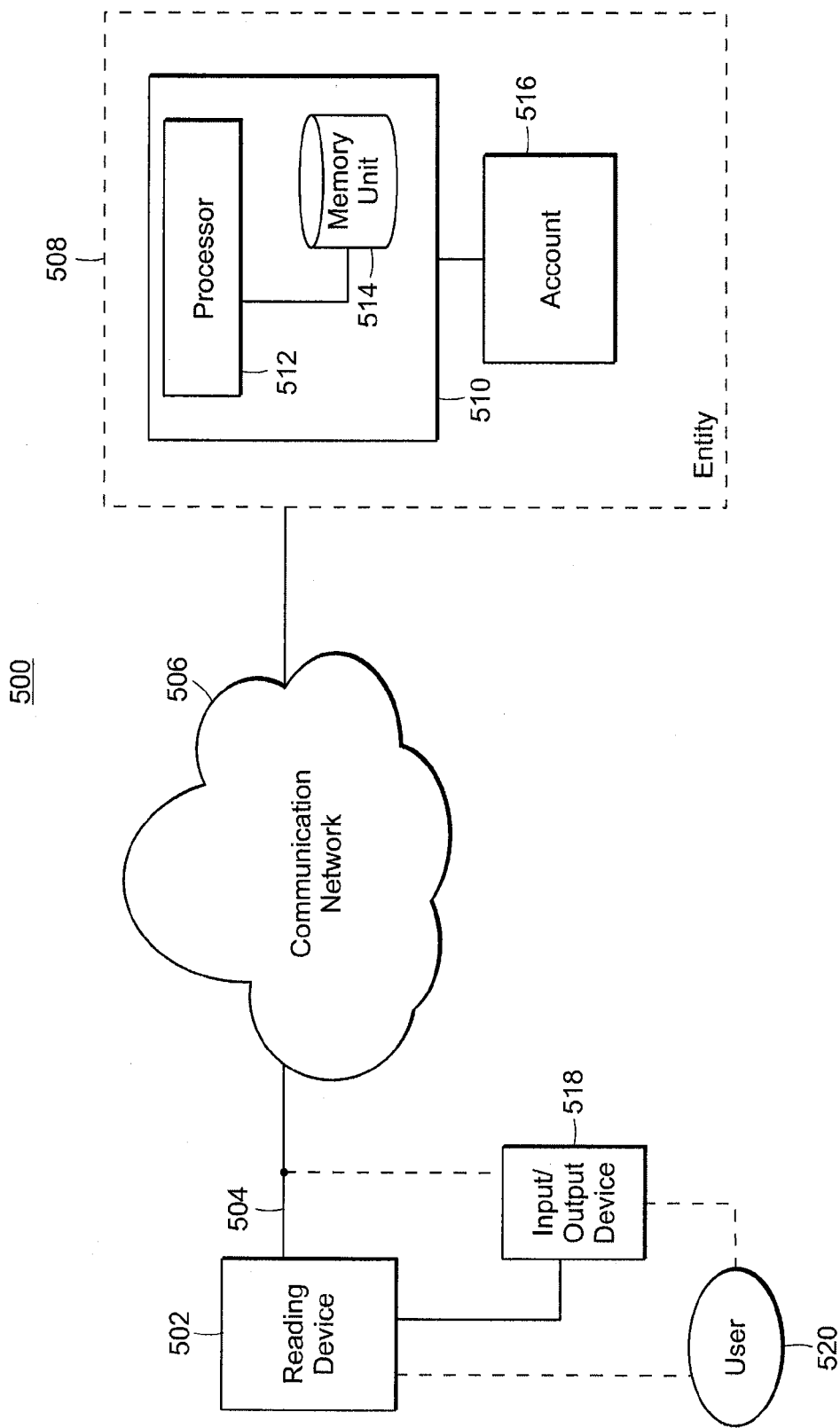
FIG. 5 illustrates an exemplary transaction system according to the exemplary embodiments of the present application.

An exemplary embodiment of data card 100 used with an exemplary transaction system 500 will be described with reference to FIG. 5. User 520 presents data card 100 for reading at reading device 502. Reading device 502 may be a stand-alone device or may be incorporated within one or more other devices. Exemplary reading devices include a POS terminal, an ATM, a security checkpoint, an airport or train station boarding gate, a hotel door lock, a fuel distribution station, a car rental desk, a restaurant reservation system, and a medical records storage system.

Upon reading the data stored on any one of data storage sections 108a-108d, the reading device 502 transmits the read data to entity 508 via communication line 504 and communication network 506. Additionally, user 520 may input instructions and/or transaction information via input device 518, and the input instructions and/or transaction information may be sent to entity 508 via communication line 504 and communication network 506. The input device 518 and reading device 512 may be independent components or may be integrated in a single device. Communication network 506 and communication line 504 may be independent components located remotely, with reading device 502 located at a distance from entity 508. Alternatively, communication network 506 and communication line 504 may be combined in another device located in close proximity to or integrated with reading device 502. Communication network 506 may include a local area network ("LAN"), a wide area network ("WAN"), an intranet, or the like, and may communicate via the Internet using Internet communication protocols. Additionally, communication network 506 and communication line 504 may include data communication lines, may communicate using wireless communication systems, or may utilize a combination of wired and wireless communication systems.

The data read, along with any information entered by the user 520 via the input device 518, are transmitted to the entity 508. The entity 508 then routes the read data and any information entered by the user 520 to transaction system 510. Transaction system 510 includes, for instance, a processor 512 and a memory unit 514. In an exemplary embodiment, the transaction system 510 is operable for evaluating the received information to determine if the user 520 is permitted to perform a desired action as described in the present application.

Entity 508 can be any establishment or collection of establishments and may include, for example, a financial entity, a brokerage entity, a governmental entity, an academic entity, a lodging entity, a transportation management entity, a medical entity, or the like. In an alternate embodiment, the entity 508 as illustrated in FIG. 5 may be associated with a mechanical system, computer system, or the like.

If the exemplary transaction system 510 determines that the user 520 is permitted to perform the desired action, for example a transaction relating to account 516, transaction system 510 provides the user 520 access to account 516. If provided access, the user may utilize, for example, input device 518 connected to the communication line 504 and communication network 506, and/or the reading device 502, to perform the desired action.

If the exemplary transaction system 510 determines that the user 520 is not permitted to perform the desired action, transaction system 510 can generate a notice and provide the notice to the user 520, for example, via the input device 518 connected to the communication line 504 and communication network 506. Alternatively, the transaction system 510 can provide the notice to the user 520 via the reading device 502.

At least part of the evaluation performed by the exemplary transaction system 510 may include storage of the received data and comparison of the received data with information stored in a lookup table and/or database. The lookup table and/or data base may be stored temporarily or permanently in memory unit 514. Data management including querying, ordering, searching, and retrieval of information of lookup tables, databases, and database-like data structures is well-known in the art, and therefore will not be described in detail herein. Additionally, processing and programming utilized in association with management and evaluation of data stored temporarily or permanently in a computer memory unit are well-known in the art, and therefore will not be described in detail herein.

Received data may be evaluated, for instance, by comparing the content and quantity of the received data with reference data stored in a lookup table and/or database, computer memory, or the like. The evaluation performed by the exemplary transaction system 510 also includes evaluation of the received data to identify the data read, to determine an identity of user 520, and to determine which data storage section 108a-108d is read at reading device 502.

In an exemplary embodiment, for example, processing unit 512 determines which data storage section 108a-108d is read at reading device 502 by examining data corresponding to at least one predetermined data field of the data storage section 108a-108d, for example, discretionary data stored in discretionary data fields 212 and 310 as shown in FIGS. 2 and 3, respectively. For instance, different data representing a code or numerical value may be stored in each of the respective data storage sections 108a-108d. Exemplary processing unit 512 may read and store the code or numerical value stored in each of the respective discretionary data fields, for example discretionary data fields 212 and 310, of data storage sections 108a-108d. The stored code or numerical value can be compared by processor 512 against values stored in a lookup table and/or a database stored temporarily or permanently in memory unit 514 to determine which data storage section 108a-108d is read. For instance, codes or numerical values may be correlated with a location of each data storage section 108a-108d, and the correlation stored in the lookup table and/or database. A corresponding value contained within the received data can be compared against those stored codes or numerical values, for example, to identify the data storage section 108a-108d that is read. For example, the lookup table and/or database may store entries corresponding to one or more values stored in specific data fields of each data storage section 108a-108d. Evaluation of the received data may include identification of the one or more values and determination of the data storage section 108a-108d that is read by comparing the one or more values with the entries stored in the lookup table and/or database.

In an exemplary embodiment, processor 512 may determine the codes or numerical values contained in the received data corresponding to each respective data field by evaluating the position of each code or numerical value with respect to, for example, codes or numerical values corresponding to the start sentinel or end sentinel fields of the data tracks of the data storage sections 108a-108d, as shown in the present application.

As will be appreciated by a person having ordinary skill in the art, however, other procedures may be utilized for determining which data storage section 108a-108d is read, and other procedures in substitution for or in addition to the procedures described above may be utilized. In an alternative embodiment, data corresponding to other data fields of the tracks of each data storage section 108a-108d, as shown in the present application, may be used by processor 512 of transaction system 510 to determine which data storage section 108a-108d is read. For instance, data stored in one or more other data fields of the one or more tracks of the respective data storage section 108a-108d may be read, stored, and compared to values on a lookup table and/or database stored temporarily or permanently in memory unit 514 of transaction system 510. Alternatively, other data fields may be added to the one or more tracks of each respective data storage section 108a-108d to facilitate identification of the data storage section 108a-108d read.

In an exemplary embodiment, the transaction system 510 of entity 508 may perform processing on the read data to determine the identity of user 520. Processing unit 512 of transaction system 510 receives and stores the data read from data storage sections 108a-108d by the reading device 502 and transmitted via communication line 504 and communication network 506. The processing unit 512 then evaluates the received and stored data to determine the codes and/or values stored in the data fields, for example, the exemplary account number field 202. The determined codes and/or numerical values can be compared by processor 512 with values stored in a lookup table and/or a database containing, for example, user information and account information. The user information may include, for example, identification information associated with a user such as a name, an address, a telephone number, and the like. The account information may include, for example, an account number, an account location, conditions and/or terms for use of the account, and the like.

In an exemplary embodiment, each data storage section 108a-108d may contain data sufficient to allow transaction system 510 of entity 508 to determine an identity of the user 520. For example, each data storage section 108a-108d may contain identification data stored in one or more data fields of one or more tracks. Processor 512 of transaction system 510 may compare the stored identification data with data stored in a lookup table and/or database to determine the identity of the user 520. Alternatively, each data storage section 108a-108d may contain account number information in, for example, account number field 202, which may be compared with data stored in a lookup table and/or database to determine the identity of user 520. The identification and/or account number information may also be compared by processor 512 with data stored in other lookup tables and/or databases to determine other information related to user 520. Alternatively, each data storage section 108a-108d may contain data sufficient to allow transaction system 510 of entity 508 to determine the identity of the user 520 by evaluating account information in combination with a determination of which data storage section 108a-108d is read, where the determination of which data storage section 108a-108d is read may be made in accordance with any of the exemplary embodiments described above.

In an exemplary embodiment, processor 512 of transaction system 510 may also receive and evaluate device identification information stored in reading device 502 and sent from reading device 502 to transaction system 510 via communication line 504 and communication network 506. The device identification information may include, for example, codes and/or numerical values identifying functions and characteristics of the reading device 502. For example, the device identification information may include information indicating a type, function, model, and manner of use of the reading device 502. Transmission and evaluation of device identification information is well-known in the art, and therefore is not described in detail herein.

In an exemplary embodiment, processor 512 may evaluate the received device identification information in combination with the received data and/or user identification information. For example, one or more software routines stored temporarily or permanently in memory unit 514 may be run by processor 512, and one or more of the device identification information, the received data, and the user identification information may be utilized as inputs to the one or more software routines. Output of the one or more software routines may include information describing steps to be taken in performing an action, or in transmitting instructions or information to the user 520. In an exemplary embodiment, output of the one or more software routines may, for example, be used by processor 512 to perform an action associated with account 516 or with another account, or may be used to generate instructions and/or other information that may be transmitted to reading device 502, input device 518, or to another device connected to transaction system 510 via communication network 506 and communication line 504.

In an exemplary embodiment, for example, instructions may be output by the one or more software routines to allow user 520 to perform an action depending on a type of reading device 502 that reads data storage sections 108a-108d. For instance, device identification information that indicates that reading device 502 is an ATM may be input to the one or more software routines, and the one or more software routines may utilize the input information in generating output indicating an action to be performed in association with a financial account. Alternatively, device identification information indicating one or more of a plurality of reading device 502 types may be used, as described in the present application.

In exemplary embodiments, processor 512 of transaction system 510 may also perform other processing using the user identification information, data storage section identification, device identification data, and lookup tables and/or databases. For example, the processor 512 may evaluate the user identification information in combination with the device identification information to create, destroy, and/or modify rules governing usage of the data card 100 and/or reading device 502 by the user 520.

Accordingly, the user 520 may request a desired transaction or other action by presenting data card 100 to the data reading device 502 in any orientation, without concern for the relative orientation of the data card and the respective data storage sections 108a-108d with respect to the data reading device 502.

Figure 6:
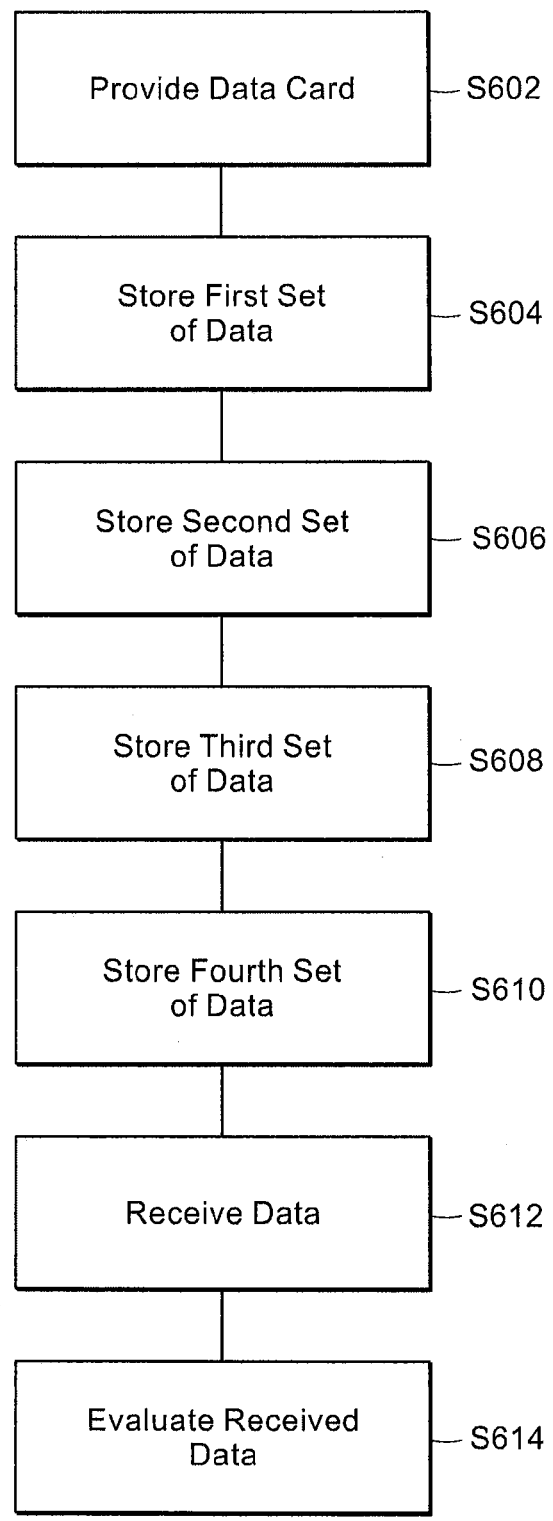
FIG. 6 is a flow diagram illustrating an exemplary method for facilitating a transaction according to the exemplary embodiments of the present application.

FIG. 6 illustrates an exemplary flow diagram for facilitating a transaction according to the present application. In the flow diagram shown in FIG. 6, a data card including a plurality of data storage sections, the plurality of data storage sections including at least a first data storage section, a second data storage section, a third data storage section, and a fourth data storage section, is provided in step S602. A first set of data is stored storing on at least the first data storage section of the data card at step S604. A second set of data is stored on at least the second data storage section of the data card at step S606. A third set of data is stored on at least the third data storage section of the data card at step S608. A fourth set of data is stored on at least the fourth data storage section of the data card at step S610. One of the first set of data, the second set of data, the third set of data, and the fourth set of data is received at step S612, and the received set of data associated with the transaction is evaluated at step S614.

Figure 7:
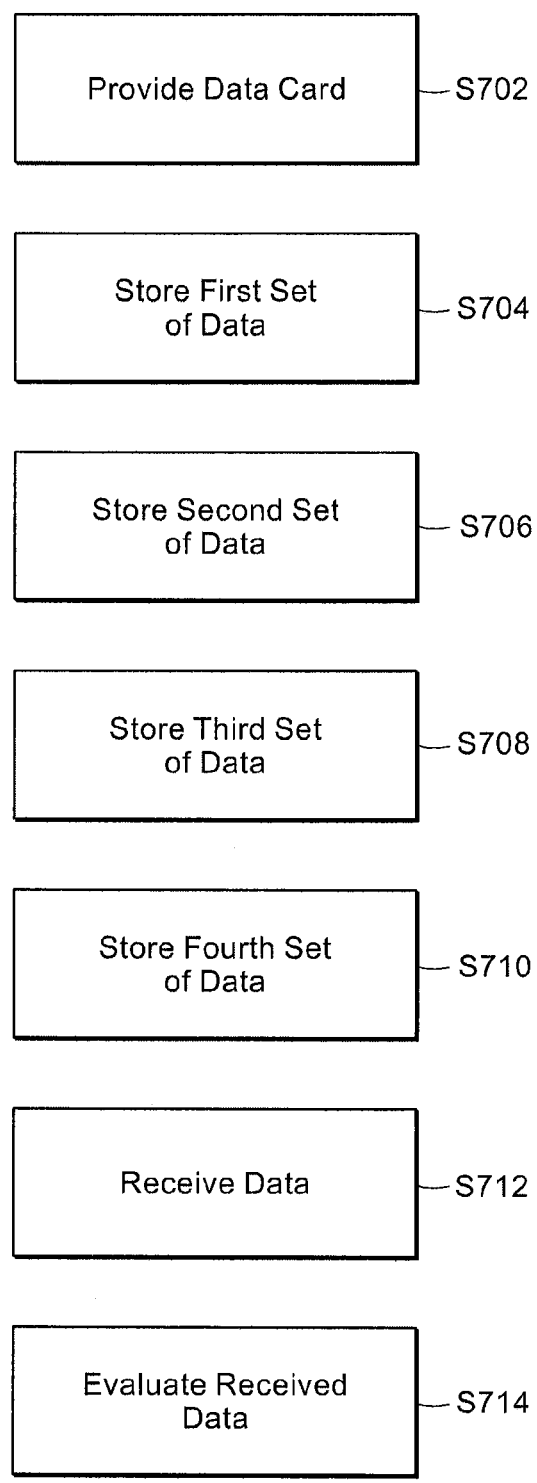
FIG. 7 is a flow diagram illustrating an exemplary method for performing an action according to the exemplary embodiments of the present application.

FIG. 7 illustrates an exemplary flow diagram for performing an action according to the present application. In the flow diagram shown in FIG. 7, a data card including a plurality of data storage sections may be provided in step S702. A first set of data is stored storing on at least a first data storage section of the data card at step S704. A second set of data is stored on at least a second data storage section of the data card at step S706. A third set of data is stored on at least a third data storage section of the data card at step S708. A fourth set of data is stored on at least a fourth data storage section of the data card at step S710. One of the first set of data, the second set of data, the third set of data, and the fourth set of data is received at step S712, and the action is performed based upon the read set of data at step S714.

Figure 8:
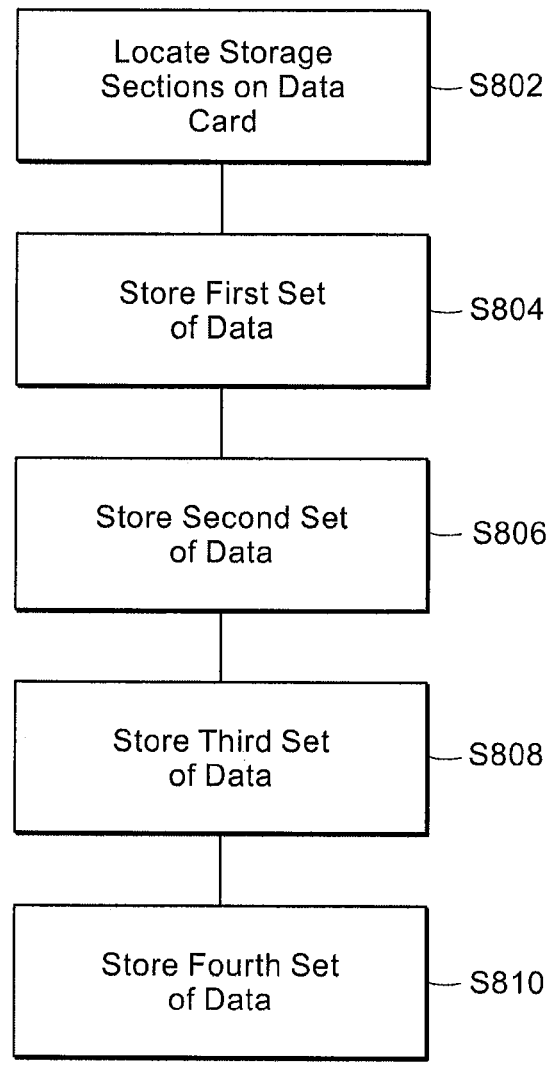
FIG. 8 is a flow diagram illustrating an exemplary method for providing a data card that facilitates a transaction according to the exemplary embodiments of the present application.

FIG. 8 illustrates an exemplary flow diagram for providing a data card that facilitates a transaction according to the present application. The flow diagram shown in FIG. 8 includes locating a plurality of data storage sections on the data card at step S802. A first set of data is stored on at least a first data storage section at step S804. A second set of data is stored on at least a second data storage section at step S806. A third set of data is stored on at least a third data storage section at step S808. A fourth set of data is stored on at least a fourth data storage section at step S810.

Figure 9:
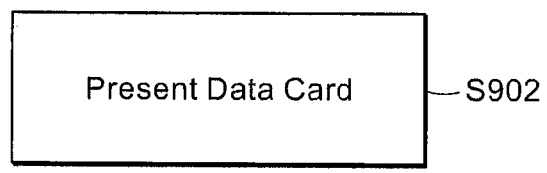
FIG. 9 is a flow diagram illustrating an exemplary method for performing a transaction according to the exemplary embodiments of the present application.

FIG. 9 illustrates an exemplary flow diagram for performing a transaction according to the present application. The flow diagram as shown in FIG. 9 includes presenting a data card having a first storage section, a second storage section, a third storage section, and a fourth storage section at step S902.

The embodiments described above are illustrative examples of the present application and it should not be construed that the present application is limited to these particular embodiments. Various changes and modifications may be effected by one skilled in the art without departing from the spirit or scope of the invention as defined in the appended claims.

It should be understood that the invention is not limited to the precise exemplary embodiments described below and that various changes and modifications may be effected by one skilled in the art without departing from the spirit or scope of the invention. For example, elements and/or features of different illustrative embodiments may be combined with each other and/or substituted for each other within the scope of the present disclosure and the appended claims. In addition, improvements and modification which become apparent to persons of ordinary skill in the art after reading the present disclosure, the drawings, and the appended claims are deemed within the spirit and scope of the present application.

The invention claimed is:

1. A method for facilitating a transaction, comprising:
providing a data card including a plurality of magnetic stripes for storing data, the plurality of magnetic stripes including at least a first magnetic stripe, a second magnetic stripe, a third magnetic stripe, and a fourth magnetic stripe;
storing a first set of data on at least the first magnetic stripe, the first set of data operable for accessing an account;
storing a second set of data on at least the second magnetic stripe, the second set of data operable for accessing the account;
storing a third set of data on at least the third magnetic stripe, the third set of data operable for accessing the account;
storing a fourth set of data on at least the fourth magnetic stripe, the fourth set of data operable for accessing the account;
receiving one of the first set of data, the second set of data, the third set of data, and the fourth set of data from a reading device; and
evaluating the received set of data, wherein
at least two of the first set of data, the second set of data, the third set of data, and the fourth set of data have different data, and
the same account is accessed for facilitating the transaction regardless of whether the first set of data, the second set of data, the third set of data, and the fourth set of data is received and evaluated.

2. The method of claim 1, wherein
the first set of data, the second set of data, the third set of data, and the fourth set of data each include different data.

3. The method of claim 1, wherein
the transaction includes at least one of a credit transaction, a debit transaction, a reward transaction, an identity verification transaction, a security access transaction, a medical information transfer transaction, a transportation transaction, an academic transaction, a home equity line of credit transaction, and a machine operation instruction transaction.

4. The method of claim 1, wherein
the account includes at least one of a credit account, a debit account, a reward account, an identity verification account, a security access account, a medical information transfer account, a transportation account, an academic account, a home equity line of credit account, and a machine operation instruction account.

5. The method of claim 1, wherein
the first magnetic stripe, the second magnetic stripe, the third magnetic stripe, and the fourth magnetic stripe each comprise a material having magnetic properties, and
the first magnetic stripe, the second magnetic stripe, the third magnetic stripe, and the fourth magnetic stripe each include at least one data field for storing data.

6. The method of claim 5, wherein
the data card includes a front surface and a back surface,
the first magnetic stripe, the second magnetic stripe, the third magnetic stripe, and the fourth magnetic stripe have a substantially rectangular shape,
the first magnetic stripe is located adjacent to an edge of the data card on the front surface,
the second magnetic stripe is located adjacent to another edge of the data card on the front surface,
the third magnetic stripe is located adjacent to an edge of the data card on the back surface, and
the fourth magnetic stripe is located adjacent to another edge of the data card on the back surface.

7. The method of claim 1, wherein
the receiving includes receiving device identification data from the reading device.

8. The method of claim 7, wherein
the reading device is associated with an automated teller machine.

9. The method of claim 7, wherein
the reading device is associated with a point of sale terminal.

10. The method of claim 7, wherein
the reading device is associated with a security system.

11. The method of claim 7, wherein
the reading device is associated with a fuel distribution station.

12. The method of claim 7, wherein
the reading device is associated with a medical records data system.

13. The method of claim 1, wherein
the receiving includes receiving data via a communication line.

14. The method of claim 1, wherein
the receiving includes receiving data wirelessly.

15. The method of claim 1, wherein
the evaluating includes evaluating the received set of data to determine an identity of a user.

16. The method of claim 1, wherein
the evaluating includes evaluating the received set of data to determine whether the received set of data is the first set of data, the second set of data, the third set of data, or the fourth set of data.

17. The method of claim 1, wherein
the evaluating includes searching at least one of a database, a lookup table, and a computer memory.

18. A method for facilitating an action, comprising:
providing a data card including a plurality of magnetic stripes for storing data, the plurality of magnetic stripes including at least a first magnetic stripe, a second magnetic stripe, a third magnetic stripe, and a fourth magnetic stripe;

storing a first set of data on at least the first magnetic stripe, the first set of data operable for accessing an account;

storing a second set of data on at least the second magnetic stripe, the second set of data operable for accessing the account;

storing a third set of data on at least the third magnetic stripe, the third set of data operable for accessing the account;

storing a fourth set of data on at least the fourth magnetic stripe, the fourth set of data operable for accessing the account;

receiving one of the first set of data, the second set of data, the third set of data, and the fourth set of data from a reading device; and evaluating the received set of data, wherein at least two of the first set of data, the second set of data, the third set of data, and the fourth set of data have different data, and the same account is accessed for facilitating the action regardless of whether the first set of data, the second set of data, the third set of data, and the fourth set of data is received and evaluated.

19. The method of claim 18, wherein
the first set of data, the second set of data, the third set of data, and the fourth set of data each include different data.

20. The method of claim 18, wherein
the action includes at least one of a credit action, a debit action, a reward action, an identity verification action, a security access action, a medical information transfer action, a transportation action, an academic action, a home equity line of credit action, and a machine operation instruction action.

21. The method of claim 18, wherein
the account includes at least one of a credit account, a debit account, a reward account, an identity verification account, a security access account, a medical information transfer account, a transportation account, an academic account, a home equity line of credit account, and a machine operation instruction account.

22. The method of claim 18, wherein
the first magnetic stripe, the second magnetic stripe, the third magnetic stripe, and the fourth magnetic stripe each comprise a material having magnetic properties, and
the first magnetic stripe, the second magnetic stripe, the third magnetic stripe, and the fourth magnetic stripe each include at least one data field for storing data.

23. The method of claim 22, wherein
the data card includes a front surface and a back surface,
the first magnetic stripe, the second magnetic stripe, the third magnetic stripe, and the fourth magnetic stripe have a substantially rectangular shape,
the first magnetic stripe is located adjacent to an edge of the data card on the front surface,
the second magnetic stripe is located adjacent to another edge of the data card on the front surface,
the third magnetic stripe is located adjacent to an edge of the data card on the back surface, and
the fourth magnetic stripe is located adjacent to another edge of the data card on the back surface.

24. The method of claim 18, wherein
the receiving includes receiving device identification data from the reading device.

25. The method of claim 24, wherein
the reading device is associated with an automated teller machine.

26. The method of claim 24, wherein
the reading device is associated with a point of sale terminal.

27. The method of claim 24, wherein
the reading device is associated with a security system.

28. The method of claim 24, wherein
the reading device is associated with a fuel distribution station.

29. The method of claim 24, wherein
the reading device is associated with a medical records data system.

30. The method of claim 18, wherein
the receiving includes receiving data via a communication line.

31. The method of claim 18, wherein
the receiving includes receiving data wirelessly.

32. The method of claim 18, wherein
the evaluating includes evaluating the received set of data to determine an identity of a user.

33. The method of claim 18, wherein
the evaluating includes evaluating the received set of data to determine whether the received set of data is the first set of data, the second set of data, the third set of data, or the fourth set of data.

34. The method of claim 18, wherein
the evaluating includes searching at least one of a database, a lookup table, and a computer memory.

35. A method for providing a data card that facilitates a transaction, comprising:

locating a plurality of magnetic stripes for storing data on the data card, the plurality of magnetic stripes including at least a first magnetic stripe, a second magnetic stripe, a third magnetic stripe, and a fourth magnetic stripe;

storing a first set of data on at least the first magnetic stripe;

storing a second set of data on at least the second magnetic stripe;

storing a third set of data on at least the third magnetic stripe;

storing a fourth set of data on at least the fourth magnetic stripe, wherein at least two of the first set of data, the second set of data, the third set of data, and the fourth set of data have different data; and the first set of data, the second set of data, the third set of data, and the fourth set of data each provide access to the same account used to facilitate the transaction.

36. The method of claim 35, wherein
the transaction includes at least one of a credit transaction, a debit transaction, a reward transaction, an identity verification transaction, a security access transaction, a medical information transfer transaction, a transportation transaction, an academic transaction, a home equity line of credit transaction, and a machine operation instruction transaction.

37. The method of claim 35, wherein
the account includes at least one of a credit account, a debit account, a reward account, an identity verification account, a security access account, a medical information transfer account, a transportation account, an academic account, a home equity line of credit account, and a machine operation instruction account.

38. The method of claim 35, wherein
the first magnetic stripe, the second magnetic stripe, the third magnetic stripe, and the fourth magnetic stripe each comprise a material having magnetic properties, and
the first magnetic stripe, the second magnetic stripe, the third magnetic stripe, and the fourth magnetic stripe each include at least one data field for storing data.

39. The method of claim 38, wherein
the data card includes a front surface and a back surface,
the first magnetic stripe, the second magnetic stripe, the third magnetic stripe, and the fourth magnetic stripe each have a substantially rectangular shape,
the first magnetic stripe is located adjacent to an edge of the data card on the front surface,
the second magnetic stripe is located adjacent to an other edge of the data card on the front surface,
the third magnetic stripe is located adjacent to an edge of the data card on the back surface,
the fourth magnetic stripe is located adjacent to an other edge of the data card on the back surface.

40. A method for performing a transaction, comprising:
presenting a data card having a first magnetic stripe, a second magnetic stripe, a third magnetic stripe, and a fourth magnetic stripe without concern for an orientation of the data card, wherein
a first set of data is stored on the first magnetic stripe, the first set of data operable for accessing an account,
a second set of data is stored on the second magnetic stripe, the second set of data operable for accessing the account,
a third set of data is stored on the third magnetic stripe, the third set of data operable for accessing the account,
a fourth set of data is stored on the fourth magnetic stripe, the fourth set of data operable for accessing the account,
at least two of the first set of data, the second set of data, the third set of data, and the fourth set of data have different data, and
the first set of data, the second set of data, the third set of data, and the fourth set of data are operable for accessing the same account for performing the transaction.

41. The method of claim 40, wherein
the transaction includes at least one of a credit transaction, a debit transaction, a reward transaction, an identity verification transaction, a security access transaction, a medical information transfer transaction, a transportation transaction, an academic transaction, a home equity line of credit transaction, and a machine operation instruction transaction.

42. The method of claim 40, wherein
the account includes at least one of a credit account, a debit account, a reward account, an identity verification account, a security access account, a medical information transfer account, a transportation account, an academic account, a home equity line of credit account, and a machine operation instruction account.

43. The method of claim 40, wherein
presenting the data card includes inserting the data card into an automated teller machine.

44. The method of claim 40 wherein
presenting the data card includes swiping or inserting the data card at a point of sale terminal.

45. The method of claim 40, wherein
presenting the data card includes swiping or inserting the data card at a security access device.

46. The method of claim 40, wherein
presenting the data card includes swiping or inserting the data card at a fuel distribution station.

47. The method of claim 40, wherein
presenting the data card includes swiping or inserting the data card at a medical records data system.

48. A data card for facilitating a transaction, comprising:
a card body having a front surface and a back surface;
a first magnetic stripe storing a first set of data operable for accessing an account, the first magnetic stripe located on the front surface;
a second magnetic stripe storing a second set of data operable for accessing the account, the second magnetic stripe located on the front surface;
a third magnetic stripe storing a third set of data operable for accessing the account, the third magnetic stripe located on the back surface; and
a fourth magnetic stripe storing a fourth set of data operable for accessing the account, the fourth magnetic stripe located on the back surface, wherein
at least two of the first magnetic stripe, the second magnetic stripe, the third magnetic stripe, and the fourth magnetic stripe store different data, and
each of the magnetic stripes is operable for accessing the same account used to facilitate the transaction.

49. The data card of claim 48, wherein
each of the first magnetic stripe, the second magnetic stripe, the third magnetic stripe, and the fourth magnetic stripe comprises a material having magnetic properties; and
each of the first magnetic stripe, the second magnetic stripe, the third magnetic stripe, and the fourth magnetic stripe include at least one data field for storing data.

50. The data card of claim 49, wherein
each of the first magnetic stripe, the second magnetic stripe, the third magnetic stripe, and the fourth magnetic stripe has a substantially rectangular shape;
the first magnetic stripe is located adjacent to a horizontal edge of the data card on the front surface;
the second magnetic stripe is located adjacent to the other horizontal edge of the data card on the front surface;
the third magnetic stripe is located adjacent to a horizontal edge of the data card on the back surface; and
the fourth magnetic stripe is located adjacent to the other horizontal edge of the data card on the back surface.

51. The data card of claim 49, wherein
each of the first magnetic stripe, the second magnetic stripe, the third magnetic stripe, and the fourth magnetic stripe has a substantially rectangular shape;
the first magnetic stripe is located adjacent to a vertical edge of the data card on the front surface;
the second magnetic stripe is located adjacent to the other vertical edge of the data card on the front surface;
the third magnetic stripe is located adjacent to a vertical edge of the data card on the back surface; and
the fourth magnetic stripe is located adjacent to the other vertical edge of the data card on the back surface.

52. The data card of claim 48, further comprising:
a fifth magnetic stripe storing a fifth set of data operable for accessing the account, the fifth magnetic stripe located on the front surface;
a sixth magnetic stripe storing a sixth set of data operable for accessing the account, the sixth magnetic stripe located on the front surface;
a seventh magnetic stripe storing a seventh set of data operable for accessing the account, the seventh magnetic stripe located on the back surface; and
an eighth magnetic stripe storing an eighth set of data operable for accessing the account, the eighth magnetic stripe located on the back surface, wherein at least two of the first magnetic stripe, the second magnetic stripe, the third magnetic stripe, the fourth magnetic stripe, the fifth magnetic stripe, the sixth magnetic stripe, the seventh magnetic stripe, and the eighth magnetic stripe store different data, each of the first magnetic stripe, the second magnetic stripe, the third magnetic stripe, the fourth magnetic stripe, the fifth magnetic stripe, the sixth magnetic stripe ion, the seventh magnetic stripe, and the eighth magnetic stripe has a substantially rectangular shape, each of the first magnetic stripe, the second magnetic stripe, the third magnetic stripe, and the fourth magnetic stripe comprises a material having magnetic properties, each of the first magnetic stripe, the second magnetic stripe, the third magnetic stripe, and the fourth magnetic stripe include at least one data field for storing data, the first magnetic stripe is located adjacent to a horizontal edge of the data card on the front surface, the second magnetic stripe is located adjacent to the other horizontal edge of the data card on the front surface, the third magnetic stripe is located adjacent to a horizontal edge of the data card on the back surface, the fourth magnetic stripe is located adjacent to the other horizontal edge of the data card on the back surface, the fifth magnetic stripe is located adjacent to a vertical edge of the data card on the front surface, the sixth magnetic stripe is located adjacent to the other vertical edge of the data card on the front surface, the seventh magnetic stripe is located adjacent to a vertical edge of the data card on the back surface, the eighth magnetic stripe is located adjacent to the other vertical edge of the data card on the back surface, and each of the magnetic stripes is operable for accessing the same account used to facilitate the transaction.

53. The data card of claim 48, wherein the transaction includes at least one of a credit transaction, a debit transaction, a reward transaction, an identity verification transaction, a security access transaction, a medical information transfer transaction, a transportation transaction, an academic transaction, a home equity line of credit transaction, and a machine operation instruction transaction.

54. The data card of claim 48, wherein the account includes at least one of a credit account, a debit account, a reward account, an identity verification account, a security access account, a medical information transfer account, a transportation account, an academic account, a home equity line of credit account, and a machine operation instruction account.

* * * * *